United States Patent
Lin

(10) Patent No.: US 6,932,026 B2
(45) Date of Patent: Aug. 23, 2005

(54) AQUATIC FARM

(76) Inventor: Ting-Jung Lin, No. 20, Lane 37, Nyao swong Rd., Yanshuei Township, Tainan County 737 (TW)

( * ) Notice: Subject to any disclaimer, the term of this patent is extended or adjusted under 35 U.S.C. 154(b) by 0 days.

(21) Appl. No.: 10/919,106

(22) Filed: Aug. 16, 2004

(65) Prior Publication Data

US 2005/0081794 A1 Apr. 21, 2005

(30) Foreign Application Priority Data

Oct. 17, 2003 (TW) .................................. 92128784 A

(51) Int. Cl.[7] .............................................. A01K 63/00
(52) U.S. Cl. ...................................................... 119/225
(58) Field of Search ................................ 119/225, 200, 119/201, 203, 206, 211, 215, 218, 224, 226, 248, 251, 252, 253

(56) References Cited

U.S. PATENT DOCUMENTS

| | | | | |
|---|---|---|---|---|
| 1,564,903 A | * | 12/1925 | Shepard ........................ 405/81 |
| 3,122,126 A | * | 2/1964 | Yamada ........................ 119/225 |
| 3,756,197 A | * | 9/1973 | Buss et al. .................... 119/225 |
| 4,836,142 A | * | 6/1989 | Duback ........................ 119/255 |
| 5,083,528 A | * | 1/1992 | Strong .......................... 119/257 |
| 5,140,941 A | * | 8/1992 | Takakuwa ..................... 119/224 |
| 5,189,981 A | * | 3/1993 | Ewald, Jr. .................... 119/225 |
| 6,148,769 A | * | 11/2000 | Pack ............................ 119/225 |

* cited by examiner

Primary Examiner—Yvonne R. Abbott
(74) Attorney, Agent, or Firm—Jackson Walker, LLP

(57) ABSTRACT

An aquatic farm has at least two segregated pools and an inter-pool transporter. The at least two segregated pools are stacked. Adjacent segregated pools are attached to each other with a vertical separation, and upper segregated pools are smaller than adjacent lower segregated pools. Each segregated pool has a gate. The inter-pool transporter is mounted detachably between the gates of adjacent segregated pools and has two end sides corresponding respectively to the gates of adjacent segregated pools.

4 Claims, 6 Drawing Sheets

US 6,932,026 B2

AQUATIC FARM

BACKGROUND OF THE INVENTION

1. Field of the Invention

The present invention relates to an aquatic farm, and more particularly to an aquatic farm that can improve the survival rate of aquatic animals raised in the aquatic farm.

2. Description of Related Art

In aquaculture, aquaculturists raise aquatic animals such as shrimp and fish in hatcheries and fish farms. A conventional fish farm in accordance with the prior art is a pool having a bottom and an enclosure. The bottom has a top flat surface. The enclosure is formed around the bottom.

The process of raising aquatic animals in a conventional fish farm comprises raising fry in a single pool till the aquatic animals are mature enough to sell. In other words, fry, juveniles and adults are raised in the same pool and use the same water. However, excrement of the juvenile and adult animals pollutes the water in the pool and serves as a breeding ground for germs that endanger the health of the fry and the entire stock. The survival rate of the fry in a single pool fish farm is lowered by the polluted water so the production yield of the fish farm is lowered.

Therefore, some aquaculturists segregate the aquatic animals into several groups based on their size and raise the groups respectively in different pools to improve the water quality, the survival rate of the fry and the production yield of the fish farm. When a group of aquatic animals in a particular pool grows to a size not suited to the pool, the group will be moved from the original pool to another larger pool or multiple pools to reduce the population density. However, aquatic animals are injured or killed in the process of moving them from one pool to another by hand or net due to the normal trauma involved in the process.

Furthermore, most aquatic animals, especially smaller fish and shrimp, naturally prefer nooks and crannies such as a corner of a fish farm pool rather than open spaces such as the flat surface of the bottom of the pool. The utility rate of the flat surface of the pool is much lower than that of the shaded corners of the fish farm pool. Statistics show the average utility rate of space for shrimp inside a conventional fish farm to be around 4.2 percent. Therefore, most conventional fish farms do not approach their economic potential.

To overcome the shortcomings, the present invention provides an aquatic farm to mitigate or obviate the aforementioned problems.

SUMMARY OF THE INVENTION

One objective of the invention is to provide an aquatic farm that has at least two segregated pools that respectively raise different sized groups of aquatic animals to improve survival of aquatic animals.

Another objective of the invention is to provide an aquatic farm that can move aquatic animals safely and with less trauma from one segregated pool to another segregated pool.

An aquatic farm in accordance with the present invention comprises at least two segregated pools and an inter-pool transporter.

The at least two segregated pools are arranged vertically. Adjacent segregated pools have a vertical separation between the pools. The upper segregated pool is smaller than the lower segregated pool. The inter-pool transporter has a sluice selectively and detachably mounted between gates in adjacent segregated pools. The inter-pool transporter allows the fry to be washed from an upper pool to a lower pool without being physically handled.

Other objectives, advantages and novel features of the invention will become more apparent from the following detailed description when taken in conjunction with the accompanying drawings.

DETAILED DESCRIPTION OF PREFERRED EMBODIMENT

Figure 1:
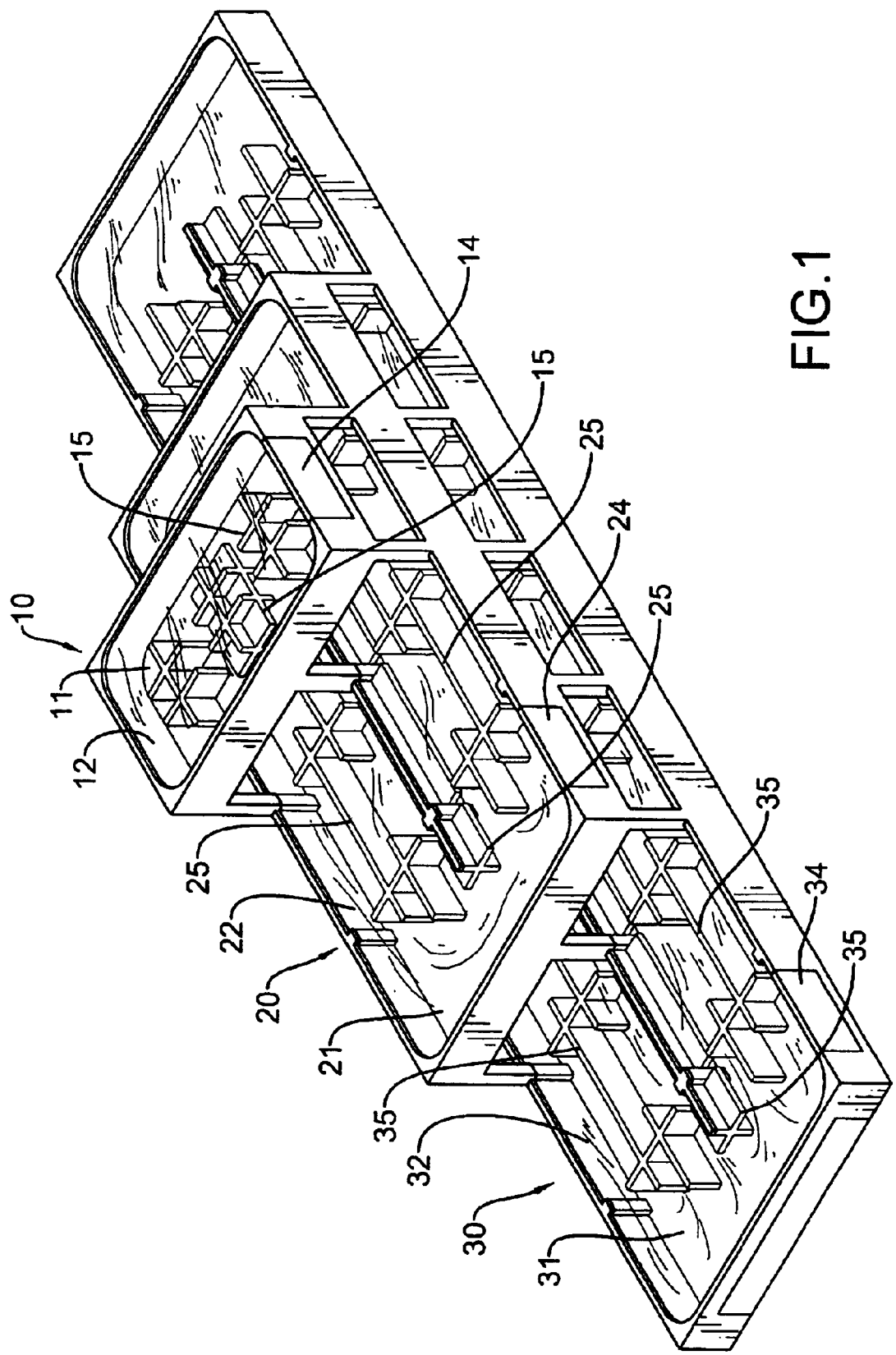
FIG. 1 is a perspective view of segregated pools of an aquatic farm in accordance with the present invention.
Figure 2:
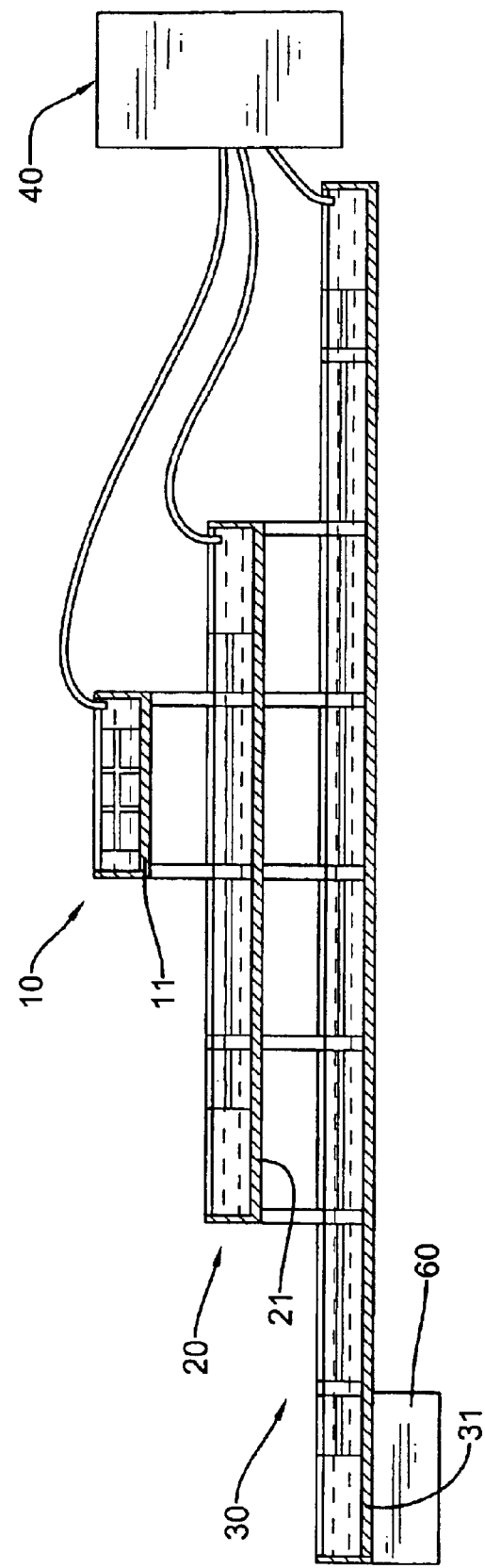
FIG. 2 is a front view in partial section of the segregated pools of the aquatic farm in FIG. 1.
Figure 3:
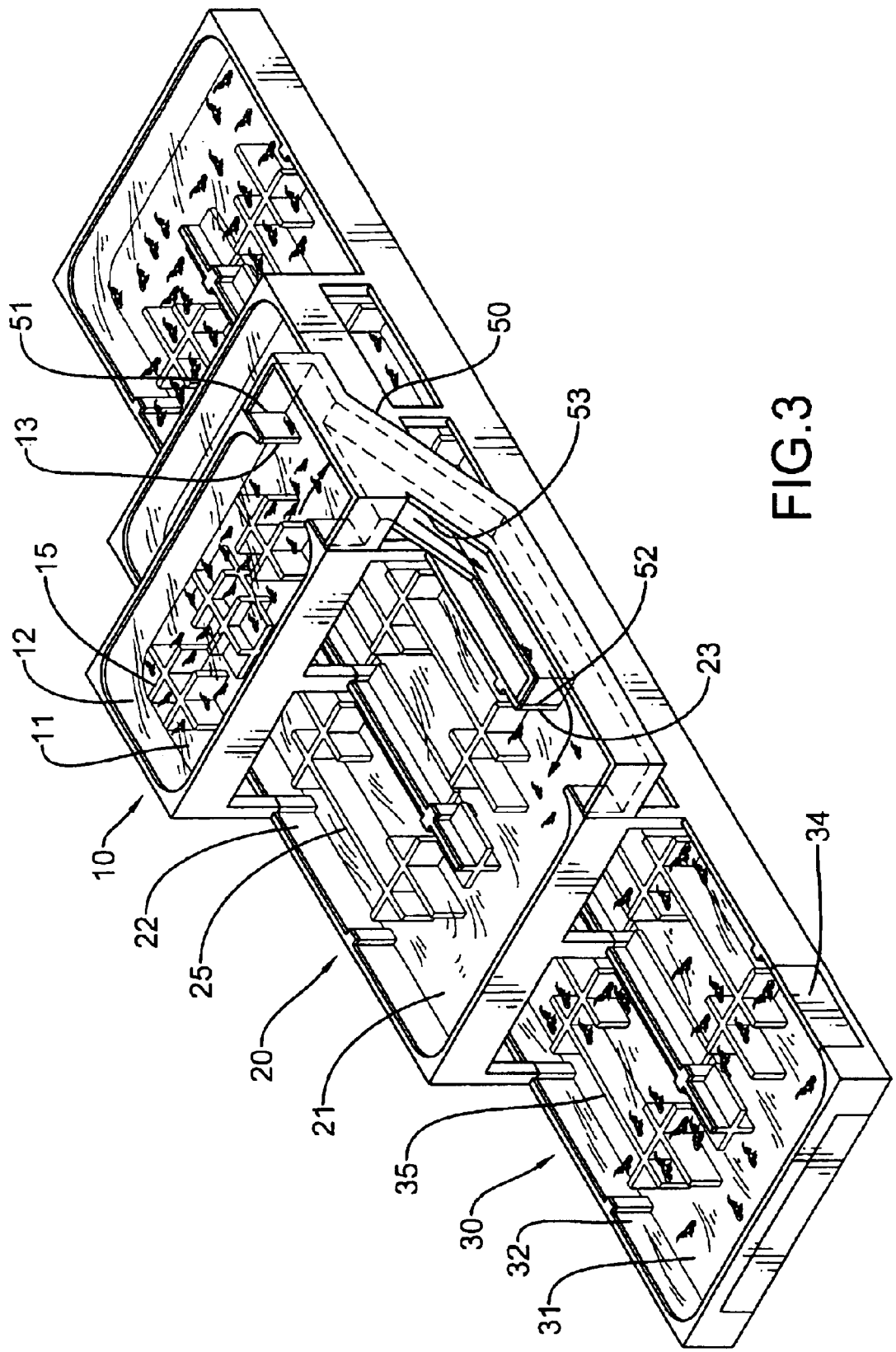
FIG. 3 is a perspective view of a aquatic farm in FIG. 1 with an inter-pool transporter is mounted between the highest segregated pool and the next lower segregated pool.

With reference to FIGS. 1 to 3, an aquatic farm in accordance with the present invention is used to raise aquatic animals such as shrimp or fish. The aquatic farm comprises at least two segregated pools (10, 20, 30), an inter-pool transporter (50), an aerator and filter device (40) and an optional cooling device (60).

The at least two segregated pools (10, 20, 30) are stacked and have different sizes. Adjacent segregated pools (10, 20, 30) are attached to each other and have a vertical separation. Higher segregated pools (10, 20) are smaller than adjacent lower segregated pools (20, 30).

Figure 4:
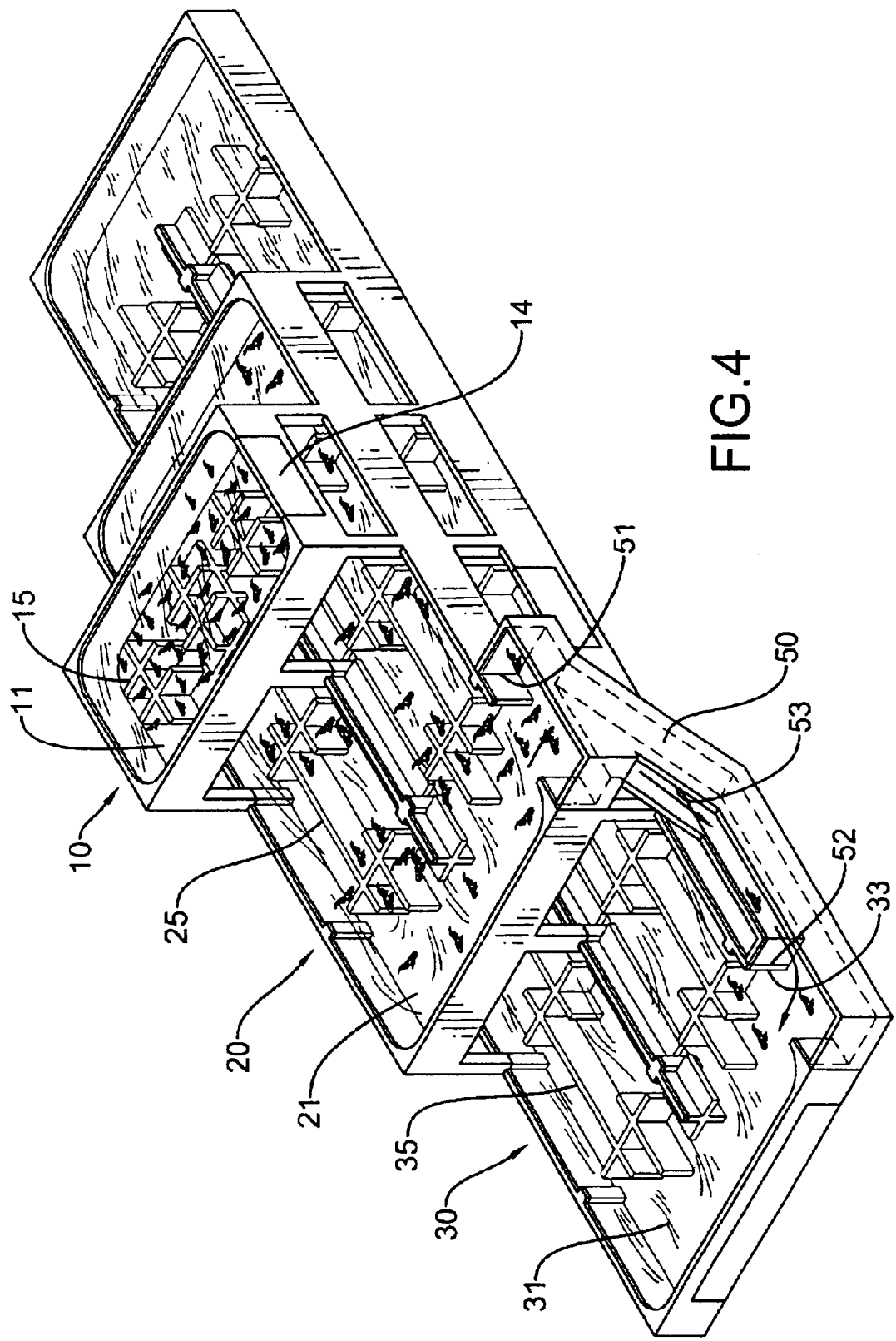
FIG. 4 is a perspective view of a aquatic farm in FIG. 1 with the inter-pool transporter is mounted between the lowest segregated pool and the adjacent (i.e. next highest) segregated pool.

With further reference to FIG. 4, each segregated pool (10, 20, 30) has a bottom (11, 21, 31), an enclosure (12, 22, 32), a pool opening (13, 23, 33), a gate (14, 24, 34) and multiple optional partitions (15, 25, 35). The bottom (11, 21, 31) has a top inclined surface and a bottom surface. The top inclined surface has a lowest side. The enclosure (12, 22, 32) is defined around the bottom (11, 21, 31) to enclose the segregated pool (10, 20, 30). The pool opening (13, 23, 33) is defined through the enclosure (12, 22, 23) at the lowest side of the top inclined surface. The gate (14, 24, 34) is mounted in the pool opening (13, 23, 33). The multiple optional partitions (15, 25, 35) are mounted on the top inclined surface of the bottom (11, 21, 31) inside the enclosure (12, 22, 32). Each partition (15, 25, 35) has multiple corners and surfaces to provide protected areas for the aquatic animals such as shrimp or fish to rest and improve the utility rate of the segregated pools (10, 20, 30).

The at least two segregated pools (10, 20, 30) are used to raise different sizes of aquatic animals. For example, a three pool aquatic farm might be used to raise fry to fingerlings or fingerlings to production size aquatic animals depending on the overall size of the aquatic farm. In a three pool aquatic farm to raise shrimp fry to adults, the highest segregated pool (10) is used to raise the smallest shrimps such as shrimp fry, the adjacent segregated pool (20) is used to raise juvenile shrimp, and the lowest segregated pool (30) is used to raise the adult shrimp.

The inter-pool transporter (50) is mounted detachably between adjacent segregated pools (10, 20, 30) and has two end sides, two apparatus openings (51, 52) and a sluice (53). The two end sides are connected respectively to the enclosures (12, 22 32) of adjacent segregated pools (10) and correspond respectively to the gates (14, 24, 34) of adjacent segregated pools (10, 20, 30). The two apparatus openings (51, 52) are defined respectively on the end sides of the inter-pool transporter (50) and correspond respectively to the gates (14, 24, 34) of adjacent segregated pools (10, 20, 30). The sluice (53) is defined in the inter-pool transporter (50) and communicates with the apparatus openings (51, 52). The inter-pool transporter (50) may be attached to the segregated pool (10, 20, 30) with bolts (not shown) and nuts (not shown). The bolts penetrate the end side and the enclosure (12, 22, 32) of the segregated pool (10, 20, 30) and the nuts are screwed respectively onto the bolts to attach the end sides respectively to the corresponding enclosures (12, 22, 32) of the segregated pools (10, 20, 30). Alternatively, the end side may have a hook (not shown) to hook onto the enclosure (12, 22, 32) of the segregated pool (10, 20, 30) to attach the inter-pool transporter (50) to the segregated pool (10, 20, 30).

The aerator and filter device (40) is connected to the segregated pools (10, 20, 30) and has a number of tubes corresponding to the segregated pools (10, 20, 30). The tubes are connected respectively to the segregated pools (10, 20, 30). The aerator and filter device (40) filters and aerates water in the segregated pools (10, 20, 30) with the tubes.

The optional cooling device (60) is mounted on the bottom surface of the bottom (31) of the lowest segregated pool (30) and cools water in the lowest segregated pool (30) to make adult creatures sluggish in the water so the adult creatures can be safely removed from the lowest segregated pool (30).

With reference to FIG. 3, the aquatic farm in accordance with the present invention can be used to raise fry to fingerling or production size adults depending on the size of the aquatic farm. For example, fry are raised in the highest segregated pool (10). When the fry grow to large to be accommodated in the highest segregated pool (10), the fry are moved to the next lower and larger segregated pool (20) with the inter-pool transporter (50). The inter-pool transporter (50) is mounted between the highest segregated pool (10) and the next lower segregated pool (20). The apparatus openings (51, 52) of the inter-pool transporter (50) correspond respectively to the gates (14, 24) in the highest and lower segregated pools (10, 20). The gates (14, 24) are opened and the fry and the water in the highest segregated pool (10) flow through the pool opening (13) and the apparatus opening (51) into the sluice (53). Then the fry and the water flow through the pool opening (23) in the lower pool (20) and the fry are raised further in the lower pool (20). The highest segregated pool (10) can be refilled with clean water, and new fry can be put into and raised inside the highest segregated pool (10).

With reference to FIG. 4, when the fry in the lower segregated pool (20) grow to juveniles and are too large to be accommodated in the segregated lower pool (20), the juveniles are moved to the lowest segregated pool (30) with the inter-pool transporter (50). The inter-pool transporter (50) is mounted between the lower segregated pool (20) and the lowest pool (30) to transport the juveniles. The juveniles are moved from the lower segregated pool (20) to the lowest segregated pool (30) with the inter-pool transporter (50) and continue to be raised in the lowest segregated pool (30) to the desired size.

Figure 5:
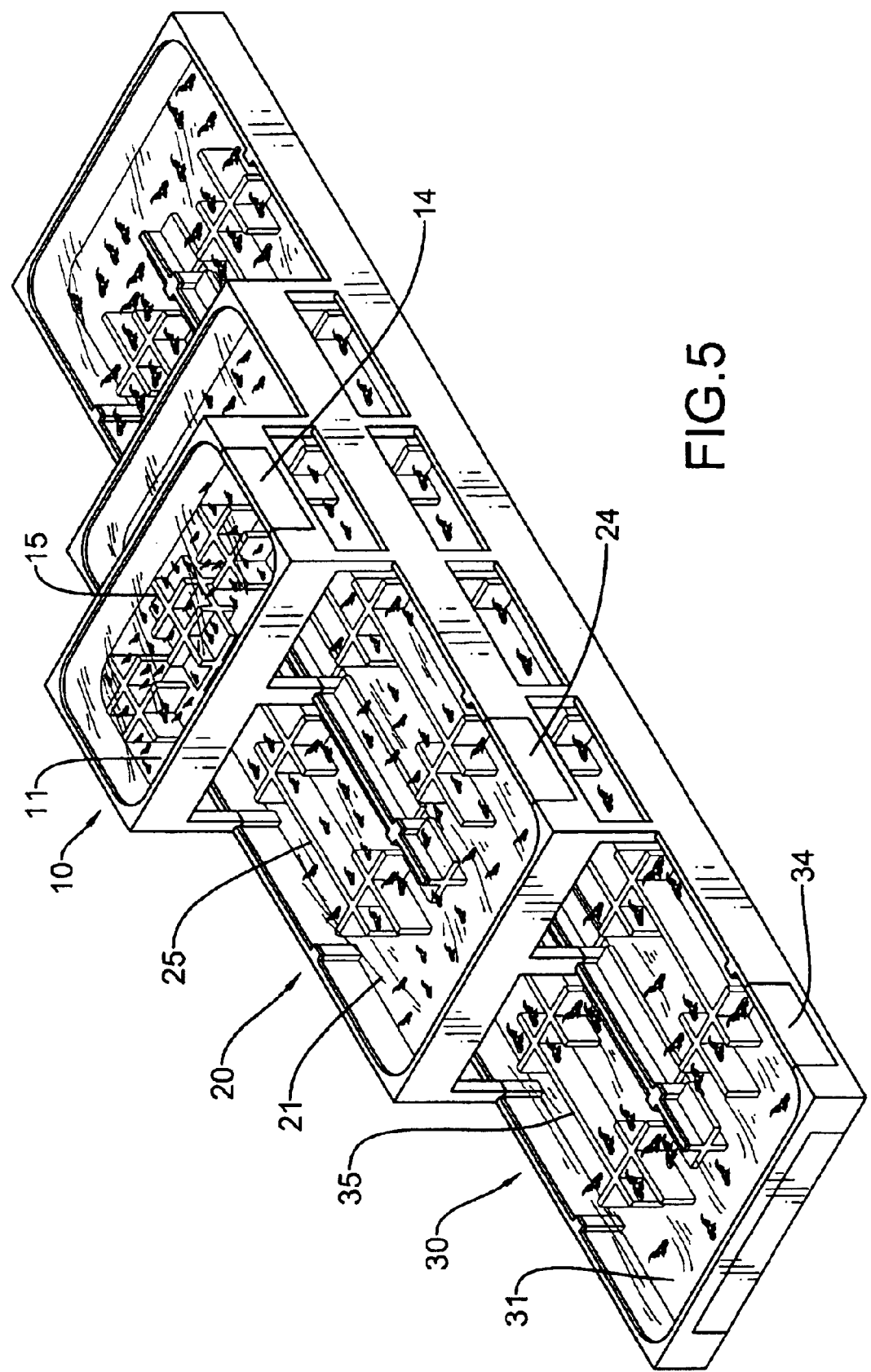
FIG. 5 is a perspective view of the aquatic farm in FIG. 1 with different sized aquatic animals in the segregated pools.
Figure 6:
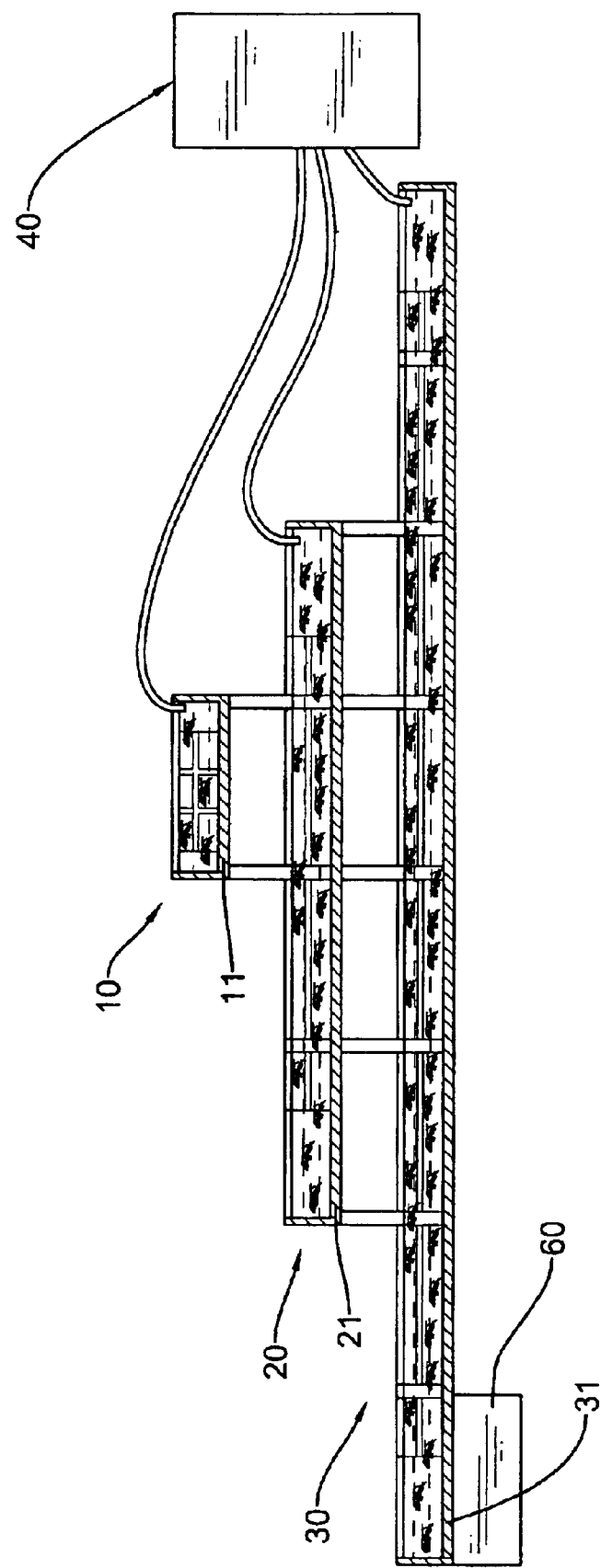
FIG. 6 is a front view in partial section of the aquatic farm in FIG. 5.

With reference to FIGS. 5 and 6, when the juveniles in the largest segregated pool (30) grow into adults, the optional cooling device lowers the temperature of the water to make the adults sluggish. The sluggish adults can be caught safely without struggling to minimize trauma and injury to the adults.

The at least two segregated pools (10, 20, 30) can respectively raise groups of aquatic animals with different sizes and improve the survival rate of the fry. The transport apparatus (50) can safely transport the aquatic animals from the higher segregated pool (10, 20) to the lower segregated pool (20, 30) to prevent the aquatic animals from being injured or killed. The partitions (15, 25, 35) cause the aquatic animals being raised to use more of the available space in the segregated pools (10, 20, 30) and improve the utility of the segregated pools (10, 20, 30). The cooling device (60) can help to catch the adult aquatic animals safely without harming them.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An aquatic farm comprising:

at least two segregated pools stacked and being different sizes and comprising a lowest segregated pool and a higher segregated pool with adjacent segregated pools being attached to each other and having a vertical separation, and the higher segregated pool being smaller than that the lower segregated pool, each segregated pool having
a bottom having
a top inclined surface having a lowest side; and
a bottom surface;
an enclosure defined around the bottom to enclose the segregated pool;
a pool opening defined through the enclosure at the lowest side of the top inclined surface; and
a gate mounted in the pool opening;
an inter-pool transporter mounted detachably between adjacent segregated pools and having
two end sides connected respectively to the enclosures of adjacent segregated pools and corresponding respectively to the gates of adjacent segregated pools;
two apparatus openings defined respectively on the end sides of the inter-pool transporter and corresponding respectively to the gates of adjacent segregated pools; and
a sluice defined in the inter-pool transporter and communicating with the apparatus openings; and
an aerator and filter device connected respectively to the water troughs of the at least two segregated pools and having
at least two tubes corresponding respectively to and connected respectively to the at least two segregated pools.

2. The a aquatic farm as claimed in claim 1, wherein each segregated pool further comprises multiple partitions mounted on the top inclined surface of the bottom inside the enclosure and each partition has multiple corners and surfaces.

3. The a aquatic farm as claimed in claim 1 further comprising a cooling device mounted on the bottom surface of the bottom of the lowest segregated pool.

4. The a aquatic farm as claimed in claim 2 further comprising a cooling device mounted on the bottom surface of the bottom of the lowest segregated pool.

* * * * *